United States Patent
Barnett et al.

(10) Patent No.: US 12,231,049 B2
(45) Date of Patent: Feb. 18, 2025

(54) DC-DC CONVERTER AND METHOD OF CONTROLLING THE SAME

(71) Applicant: Qorvo US, Inc., Greensboro, NC (US)

(72) Inventors: Raymond Barnett, Plymouth, MN (US); Brett Smith, Fayette, IA (US); Thinh Ba Nguyen, Hanoi (VN)

(73) Assignee: Qorvo US, Inc., Greensboro, NC (US)

( * ) Notice: Subject to any disclaimer, the term of this patent is extended or adjusted under 35 U.S.C. 154(b) by 288 days.

(21) Appl. No.: 18/055,444

(22) Filed: Nov. 15, 2022

(65) Prior Publication Data

US 2023/0223852 A1    Jul. 13, 2023

(30) Foreign Application Priority Data

Jan. 7, 2022    (VN) .............................. 1-2022-00101

(51) Int. Cl.
*H02M 3/158*    (2006.01)
*H02M 1/08*     (2006.01)

(52) U.S. Cl.
CPC ......... *H02M 3/1586* (2021.05); *H02M 1/083* (2013.01)

(58) Field of Classification Search
CPC ............................. H02M 3/1586; H02M 1/083
USPC ........................................................ 323/217
See application file for complete search history.

(56) References Cited

U.S. PATENT DOCUMENTS

| | | | |
|---|---|---|---|
| 10,014,777 B1 * | 7/2018 | Shumkov ............ | H02M 3/1582 |
| 2010/0164435 A1 * | 7/2010 | Bartling .............. | H02M 3/1582 |
| | | | 320/128 |
| 2018/0115280 A1 * | 4/2018 | Ikeda ....................... | F02P 3/01 |

OTHER PUBLICATIONS

Diodes Incorporated, "AP65251: 2A, 16V, 500KHz ACOT Synchronous DC/DC Buck Converter," Document No. DS36109 Rev. 1-2, Oct. 2017, Retrieved from the Internet: [URL: https://web.archive.org/web/20200927205523/https://www.diodes.com/assets/Datasheets/AP65251.pdf], 19 pages.

Akhilesh, K. et al., "Control Scheme for Improved Efficiency in a H-bridge Buck-Boost Converter," 2018 IEEE International Conference on Power Electronics, Drives and Energy Systems (PEDES), Dec. 18-21, 2018, Chennai, India, IEEE, 6 pages.

Hsu, Y.-C. et al., "Modeling of the control behavior of current-mode constant on-time boost converters," 2015 IEEE And International Future Energy Electronics Conference (IFEEC), Nov. 1-4, 2015, Taipei, Taiwan, IEEE, 6 pages.

(Continued)

*Primary Examiner* — Yemane Mehari
(74) *Attorney, Agent, or Firm* — Withrow & Terranova, P.L.L.C.

(57) ABSTRACT

A DC-DC converter is disclosed having an electronic switch network having a supply node, a ground node, an output node, a first inductor node, a second inductor node, and switch control inputs. An inductor is coupled between the first inductor node and the second inductor node. Control logic circuitry has switch control outputs coupled to the switch control inputs, wherein the control logic circuitry is configured to cause the electronic switch network to couple the inductor between the supply node and the output node to provide current flow through the inductor for a fixed time period, and at the end of the fixed time period to measure a check time period until the current flow through the inductor is equal to predetermined current value, and based upon the measured check time period to determine to switch between buck operation and boost operation or boost operation and buck operation.

20 Claims, 8 Drawing Sheets

(56) References Cited

OTHER PUBLICATIONS

Huang, Q. et al., "An improved constant on/off time control scheme for photovoltaic DC/DC MIC," 2013 Twenty-Eighth Annual IEEE Applied Power Electronics Conference and Exposition (APEC), Mar. 17-21, 2013, Long Beach, CA, USA, IEEE, 6 pages.

Wang, J. et al., "Multi-switching period oscillation phenomenon in constant-on-time controlled buck-boost converter," 2016 IEEE 8th International Power Electronics and Motion Control Conference (IPEMC-ECCE Asia), May 22-26, 2016, Hefei, China, IEEE, 4 pages.

Diodes Incorporated, "AP65251WU-EVM: 500KHz 16V 2A Synchronous DC/DC Buck Converter," Document No. Rev. 1, Mar. 2017, Retrieved from the Internet: [URL: https://www.diodes.com/assets/Evaluation-Boards/AP65251WU-EVM-Manual-Rev1.pdf], 5 pages.

* cited by examiner

DC-DC CONVERTER AND METHOD OF CONTROLLING THE SAME

RELATED APPLICATIONS

This application claims priority to Vietnam patent application serial number 1-2022-00101, filed Jan. 7, 2022, the disclosure of which is hereby incorporated herein by reference in its entirety.

FIELD OF THE DISCLOSURE

The present disclosure relates to converting the power required by electronic systems from one voltage level to another. In particular, the present disclosure relates to a direct current (DC)-to-DC converter having increased conversion efficiency.

BACKGROUND

The amount of time a cellular handset can operate on a fully charged battery conflicts with the increasing consumer demand for more features and smaller handsets. To keep up with the power requirements brought about by these consumer demands, the cellular handset industry has turned to advanced higher capacity battery technology. However, a trade-off exists in that an advanced battery can be discharged to a lower operating voltage than typical batteries. The lower operating voltage is incompatible with existing power amplifier (PA) technology that is used in some of the basic building blocks of cellular handset circuitry. To solve this lower voltage incompatibility issue, the cellular handset industry has turned to direct current (DC)-to-DC conversion technology to boost the voltage of advanced batteries to a level that is compatible with existing PA technology. Moreover, it is widely recognized that DC-DC conversion technology is generally much more efficient at regulating output voltage than typical linear voltage regulator technology. Thus, DC-DC conversion technology offers increased efficiency that can provide longer handset operation time or smaller handsets while stepping up the voltage for compatibility with existing PA technology. However, traditional DC-DC conversion technology has lower than desired efficiency at a boundary of buck operation and buck-boost operation, or alternately, at a boundary of boost operation and buck-boost operation. Therefore, a need remains for an improved DC-DC converter with higher efficiency at the boundary of buck operation and buck-boost operation, or alternately, at the boundary of boost operation and buck-boost operation.

SUMMARY

A DC-DC converter is disclosed having an electronic switch network having a supply node, a ground node, an output node, a first inductor node, a second inductor node, and switch control inputs. An inductor is coupled between the first inductor node and the second inductor node. Control logic circuitry has switch control outputs coupled to the switch control inputs, wherein the control logic circuitry is configured to cause the electronic switch network to couple the inductor between the supply node and the output node to provide current flow through the inductor for a fixed time period, and at the end of the fixed time period to measure a check time period until the current flow through the inductor is equal to predetermined current value, and based upon the measured check time period to determine to switch between buck operation and boost operation or boost operation and buck operation.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Figure 1:
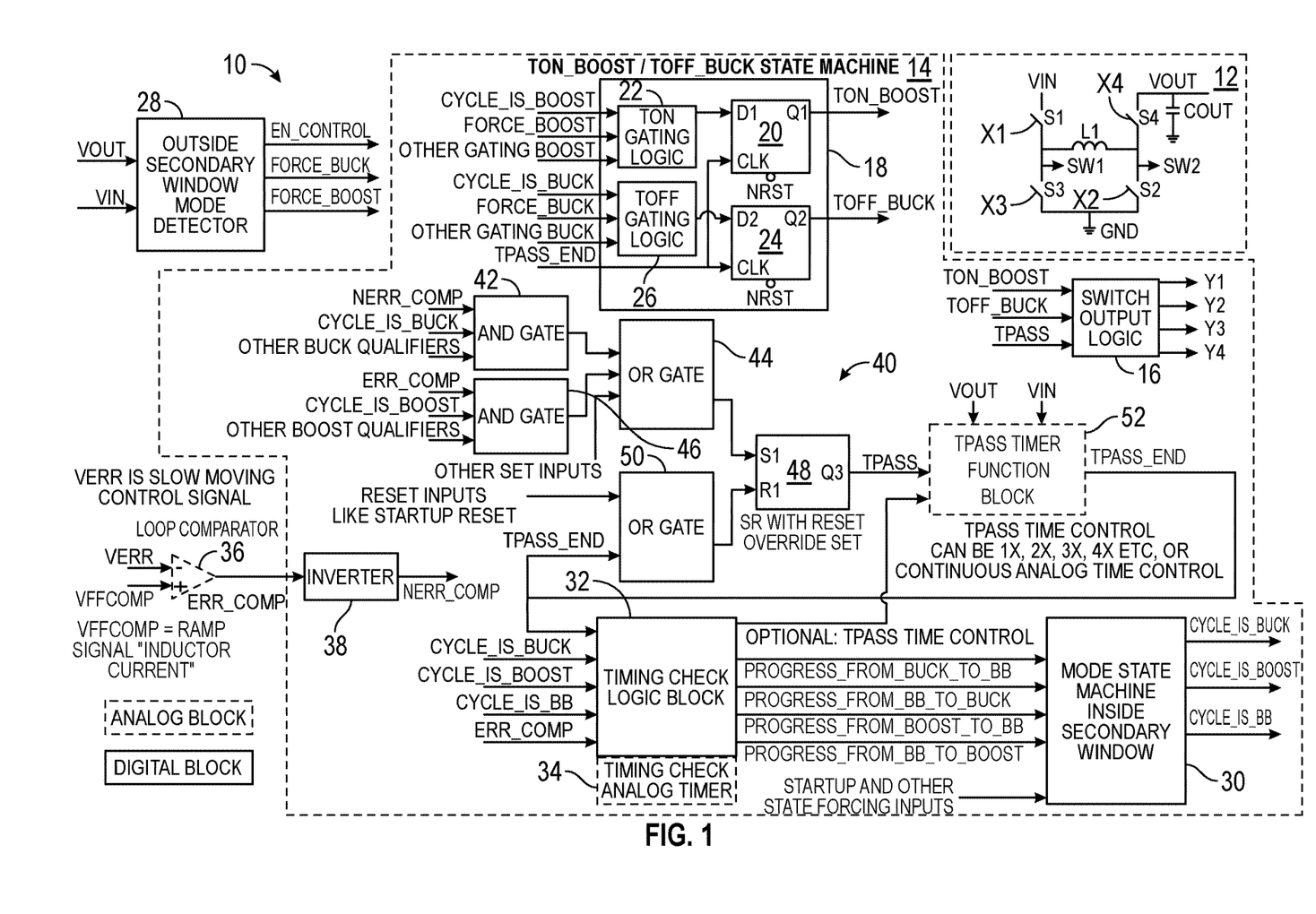
FIG. 1 is a block diagram of an exemplary embodiment of a direct current (DC)-to-DC (DC-DC) converter that is structured in accordance with the present disclosure.

FIG. 1 is a block diagram of an exemplary embodiment of a direct current (DC)-to-DC (DC-DC) converter 10 that is structured in accordance with the present disclosure. The DC-DC converter 10 includes an electronic switch network 12 having a supply node labeled VIN, a ground node labeled GND, an output node labeled VOUT, a first inductor node labeled SW1, a second inductor node labeled SW2, and switch control inputs labeled X1, X2, X3, and X4. In the exemplary embodiment of FIG. 1, the switch control inputs X1, X2, X3, and X4 control electronic switches S1, S2, S3 and S4, respectively. The electronic switches S1, S2, S3 and S4 may be field-effect transistors.

During operation of the switch network 12, all four switches S1, S2, S3, and S4 are active in a buck-boost mode as the DC-DC converter 10 transitions between the buck operation of a buck mode to the boost operation of a boost mode and as the DC-DC converter 10 transitions from boost operation to buck operation. In a buck-only mode, the second switch S2 is constantly off and the fourth switch S4 is constantly on. In a boost-only mode, the first switch S1 is constantly on and the third switch S3 is constantly off.

In the exemplary embodiment of FIG. 1, a switch output logic block 16 generates switch control signals at switch control outputs Y1, Y2, Y3, and Y4 to control the opening and closing of the switches S1, S2, S3, and S4. The switch output block 16 receives a boost timing signal TON_BOOST to which the switch output logic block 16 is responsive to generate the switch control signals for a boost cycle. The switch output block 16 also receives a buck timing signal TOFF_BUCK to which the switch output logic block 16 is responsive to generate the switch control signals for a buck cycle. The switch output block 16 further receives a timing signal representing the fixed period TPASS to which the switch output logic block 16 is responsive to generate the switch control signals that open the second switch S2 and the third switch S3 while closing the first switch S1 and the fourth switch S4 so that current will flow through the inductor L1 between the input node VIN and the output node VOUT for the fixed period TPASS.

A TON_BOOST/TOFF_BUCK state machine 18 generates the boost timing signal TON_BOOST and the buck timing signal TOFF_BUCK. The TON_BOOST/TOFF_BUCK state machine 18 has a first delay flip-flop 20 having a first output Q1 from which the TON_BOOST is passed to the switch output logic 16. A first flip-flop input D1 is coupled to an output of a TON gating logic block 22 that is included in the TON_BOOST/TOFF_BUCK state machine 18. The TON gating logic block 22 receives a boost determination signal CYCLE_IS_BOOST indicating that an immediate mode is boost mode. The TON gating logic block 22 also receives a force boost signal FORCE_BOOST that forces the immediate mode to be boost mode. In this exemplary embodiment, the TON gating logic block 22 further receives a boost gating signal labeled Other Gating Boost.

The TON_BOOST/TOFF_BUCK state machine 18 has a second delay flip-flop 24 having a second output Q2 from which the buck timing signal TOFF_BUCK is passed to the switch output logic 16. A second flip-flop input D2 is coupled to an output of a TOFF gating logic block 26 that is included in the ON_BOOST/TOFF_BUCK state machine 18. The TOFF gating logic block 26 receives a buck determination signal CYCLE_IS_BUCK indicating that an immediate mode is buck mode. The TOFF gating logic block 26 also receives a force buck signal FORCE_BUCK that forces the immediate mode to be the buck mode. In this exemplary embodiment, the TOFF gating logic block 26 further receives a buck gating signal labeled Other Gating Buck. The first delay flip-flop 20 and the second delay flip-flop 24 each have a clock input CLK that receives a clock signal TPASS_END that activates the first delay flip-flop 20 and the second delay flip-flop 24 by a transition of the fixed period TPASS. The transition, for example, may be the trailing edge of the fixed period TPASS. Each of the first delay flip-flop 20 and the second delay flip-flop 24 has a reset input NRST for resetting the first output Q1 and the second output Q2, respectively.

Figure 2:
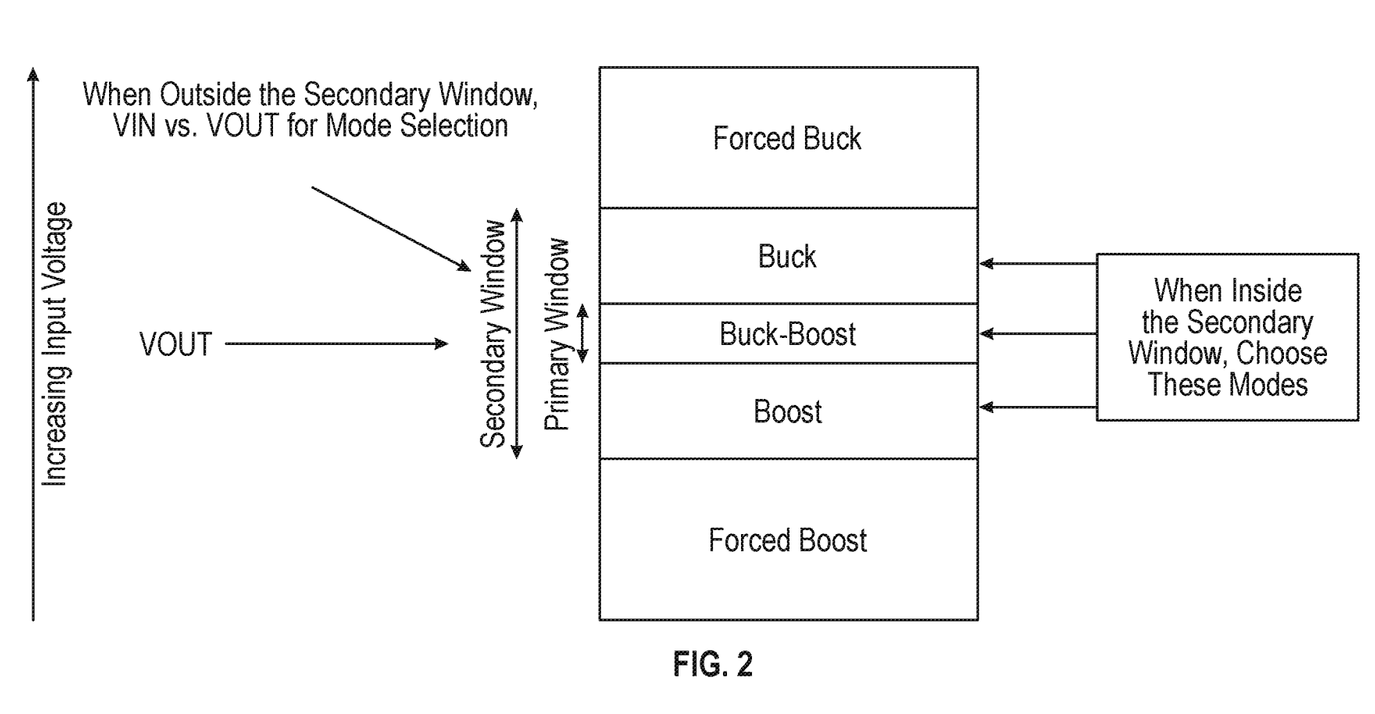
FIG. 2 is a diagram depicting boundaries of an inside primary window and an outside secondary window.

The force buck signal FORCE_BUCK and the force boost signal FORCE_BOOST are generated by an outside secondary window mode detector 28, which is configured to determine if the DC-DC converter 10 should be in a full buck mode or a full boost mode. See FIG. 2 for a diagram depicting boundaries of an inside primary window and an outside secondary window. The outside secondary window mode detector 28 is configured to compare the input voltage to an input voltage threshold and to compare an output voltage threshold and in response to generate the force buck signal FORCE_BUCK if the input voltage and/or the output voltage is too high above the input voltage threshold and the output voltage threshold. The outside secondary window mode detector 28 is also configured to compare the input voltage to the input voltage threshold and to compare the output voltage to the output voltage threshold and in response to generate the force boost signal FORCE_BOOST if the input voltage and/or the output voltage is too low below the input voltage threshold and the output voltage threshold.

Turning back to FIG. 1, a mode state machine 30 for the inside primary window (FIG. 2) is configured to generate the buck determination signal CYCLE_IS_BUCK, the boost determination signal CYCLE_IS_BOOST, the buck/boost determination signal CYCLE_IS_BB in response to mode transition signals. The mode state machine 30 also includes a start signal input configured to receive a start signal labeled STARTUP. In some embodiments, the start signal input may accept other state forcing inputs.

A timing check logic block 32 generates the mode transition signals, one of which is a first mode transition signal that indicates the DC-DC converter 10 should progress from the buck mode to the buck/boost mode. The first mode transition signal is labeled PROGRESS_FROM_BUCK_TO_BB. A second mode transition signal indicates that the DC-DC converter 10 should progress from the buck/boost mode to the buck mode. The second mode transition signal is labeled PROGRESS_FROM_BB_TO_BUCK. A third mode transition signal indicates that the DC-DC converter 10 should progress from the boost mode to the buck/boost mode. The third mode transition signal is labeled PROGRESS_FROM_BOOST_TO_BB. A fourth mode transition signal indicates that the DC-DC converter 10 should progress from the buck/boost to the boost mode. The fourth mode transition signal is labeled PROGRESS_FROM_BUCK/BOOST_TO_BOOST. The timing check logic block 32 generates the mode transition signals in response to feedback of the buck determination signal CYCLE_IS_BUCK, the boost determination signal CYCLE_IS_BOOST, and a buck/boost determination signal CYCLE_IS_BB. The timing check logic 32 is enabled/disabled by an error comparison signal, which is labeled ERR_COMP in FIG. 1. The timing check logic 32 starts generating the mode transition signals at the end of the TPASS period, which is indicated by the end of TPASS clock signal labeled TPASS_END.

An analog timer 34 generates the timing signals for the timing check logic block 32. The timing check logic block 32 may also generate an optional timing control signal that may pass continuous analog time control to circuitry external to the timing check logic block 32. The optional timing control signal is labeled OPTIONAL:TPASS TIME CONTROL. The optional timing control signal may control the length of the period of the TPASS signal. Exemplary length control for the TPASS signal may be but is not limited to one times 1×, two times 2×, three times 3×, and four times 4×, or a non-integer analog or continuous time control.

A loop comparator 36, e.g., an analog comparator, compares an error voltage VERR to a ramp signal VFFCOMP that is indicative of the inductor current flowing through L1 and in response generates an error comparison signal ERR_COMP. Note that the error voltage is at least an order of magnitude slower than the ramp signal VFFCOMP. An inverter 38 receives the error comparison signal ERR_COMP and in response generates an inverted error comparison signal NERR_COMP that is used by TPASS generator circuitry 40.

In the exemplary embodiment of FIG. 1, the TPASS generator circuitry 40 includes a first AND gate 42 that receives the inverted error comparison signal NERR_COMP and the buck determination signal CYCLE_IS_BUCK. In some embodiments, the first AND gate 42 also receives other buck qualifiers. The first AND gate 42 is configured to perform an AND logic function on these signals and output a first AND result to a first OR gate 44.

The TPASS generator circuitry 40 also includes a second AND gate 46 that receives an error comparison signal ERR_COMP and the boost determination signal CYCLE_IS_BOOST. In some embodiments, the second AND gate 46 also receives other boost qualifiers. The second AND gate 42 is configured to perform an AND logic function on these signals and output a second AND result to the first OR gate 44. The first OR gate 44 is configured to perform a logic OR function on the first AND result and the second AND result and output a first OR result to a set input S1 of a set/reset flip-flip 48. In some embodiments, the first OR gate 44 receives other set inputs that are also input into the first OR gate 44.

Returning to the electronic switch network 12, an inductor L1 is coupled between the first inductor node SW1 and the second inductor node SW2. Control logic circuitry 14 has switch control outputs Y1, Y2, Y3, and Y4 are coupled to the switch control inputs X1, X2, X3, X4, respectively. The control logic circuitry 14 is configured to cause the electronic switch network 12 to selectively couple the inductor L1 between the supply node VIN and the output node VOUT to provide current flow through the inductor L1 for a fixed period, known hereinafter as TPASS, and at the end of the fixed period TPASS to measure a time period until the current flow through the inductor L1 reaches a predetermined value, and based upon the measured time period to determine to switch between a buck operation and a boost operation or the boost operation and the buck operation. In some embodiments the predetermined current value is indicated at an instance when the ramp signal VFFCOMP equals or crosses the voltage VERR. In some embodiments, the predetermined current value is zero at the instance when the ramp signal VFFCOMP equals or crosses the voltage VERR. In the electronic switch network 12, an output capacitor COUT is coupled between the output node VOUT and the ground node GND. Energy is transferred between the inductor L1 and the output capacitor COUT when the fourth switch S4 and either the first switch S1 or the third switch S3 is closed.

A second OR gate 50 receives reset inputs and the end of TPASS clock signal labeled TPASS_END. The second OR gate 50 is configured to perform a logic OR function on these two signals and output a second OR result to a reset input R1 of the set/reset flip-flop 48, which in response is configured to output the TPASS signal. A TPASS timer function block 52 is configured to receive the TPASS signal, the TPASS time control and voltage at the VIN node and voltage at the VOUT node to determine the end of TPASS clock signal labeled TPASS_END.

During operation, at startup an initial state is chosen based on input conditions, which are the buck determination signal CYCLE_IS_BUCK, the boost determination signal CYCLE_IS_BUCK, and a buck/boost determination signal CYCLE_IS_BB. Only one of the signals is at a true logic state at a time.

If the secondary window mode detector 28 indicates that either of the input voltage or the output voltage is outside the secondary window, then the DC-DC converter 10 is forced into the buck mode or the boost mode. In either forced buck mode or the forced boost mode, the DC-DC converter 10 operates as a standard constant-on-time control type.

If the outside secondary window mode detector 28 indicates that either of the input voltage or the output voltage are inside the secondary window, then the mode state machine 30 determines cycle-by-cycle behavior of a control loop of the DC-DC converter 10. On each cycle, one of the buck determination signal CYCLE_IS_BUCK, the boost determination signal CYCLE_IS_BOOST, and the buck/boost determination signal CYCLE_IS_BB is determined to be the true mode. An initial portion of each of the buck determination signal CYCLE_IS_BUCK, the boost determination signal CYCLE_IS_BOOST, and the buck/boost determination signal CYCLE_IS_BB starts with a longer period TPASS, such as two times TPASS_2×.

If the buck determination signal CYCLE_IS_BUCK is set true and the inverted error comparison NERR_COMP is set true, the SET input to SR=true, then the pass period TPASS is activated. Thus, the first switch S1 and the fourth switch S4 are switched to allow current to flow between the input node VIN and the output node VOUT. Once the pass period TPASS period has expired, the clock signal TPASS_END is set to true. In response, the SR flip-flop is reset to deactivate the pass period TPASS. The pass period TPASS time is typically on the order of microseconds. For embodiments of the DC-DC converter 10 that operate at lower frequencies, the pass period TPASS may be several microseconds, while for higher frequencies the pass period TPASS may be less than one microsecond.

Next timing checks are initiated by the TON_BOOST/TOFF_BUCK state machine 18 to determine whether states of mode have occurred. If no state of mode has occurred, the previous mode remains as indicated by the buck determination signal CYCLE_IS_BUCK, the boost determination signal CYCLE_IS_BOOST, or the buck/boost determination signal CYCLE_IS_BB.

Figure 3:
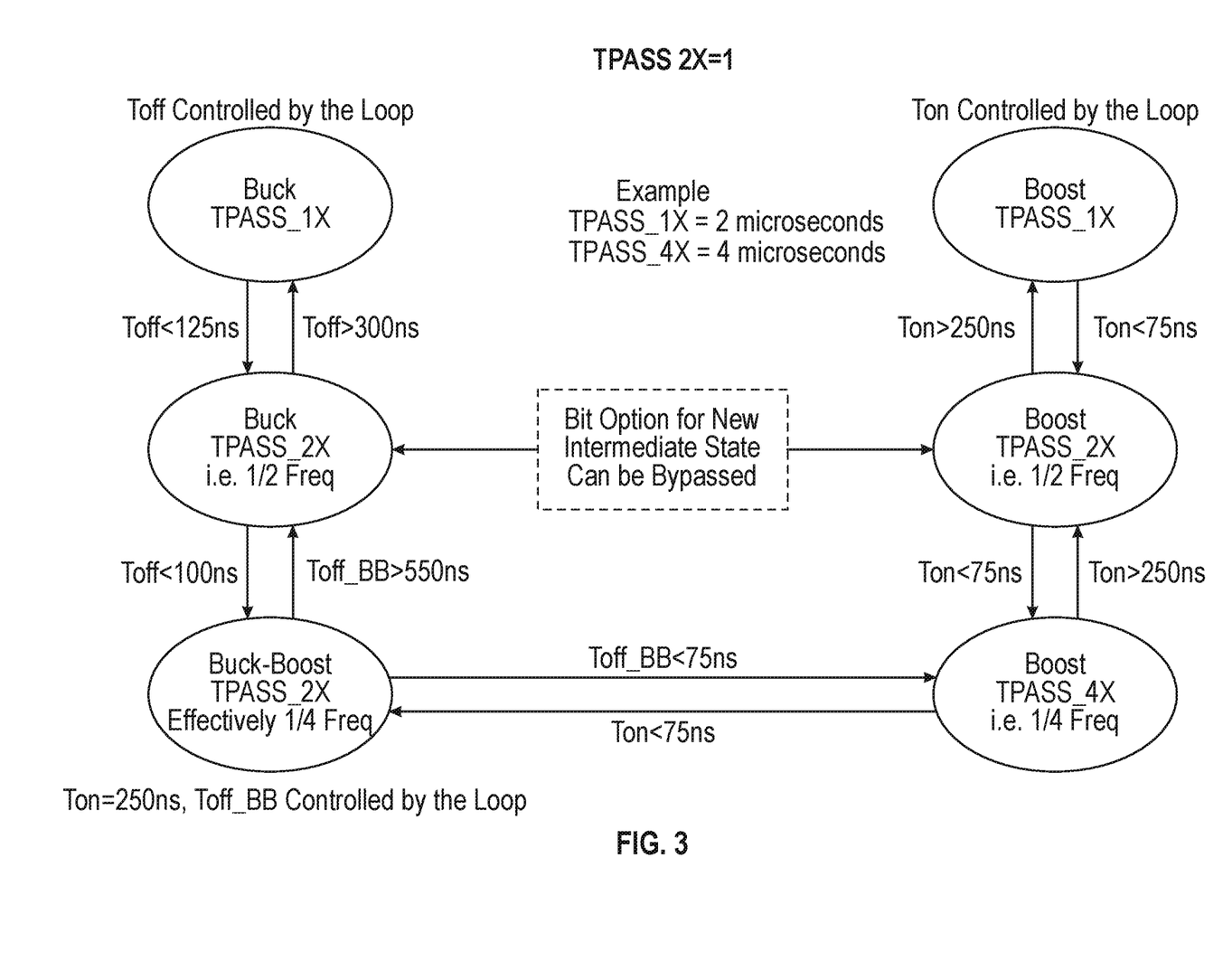
FIG. 3 is an exemplary state diagram depicting mode states for the DC-DC converter depicted in FIG. 1.
Figure 4:
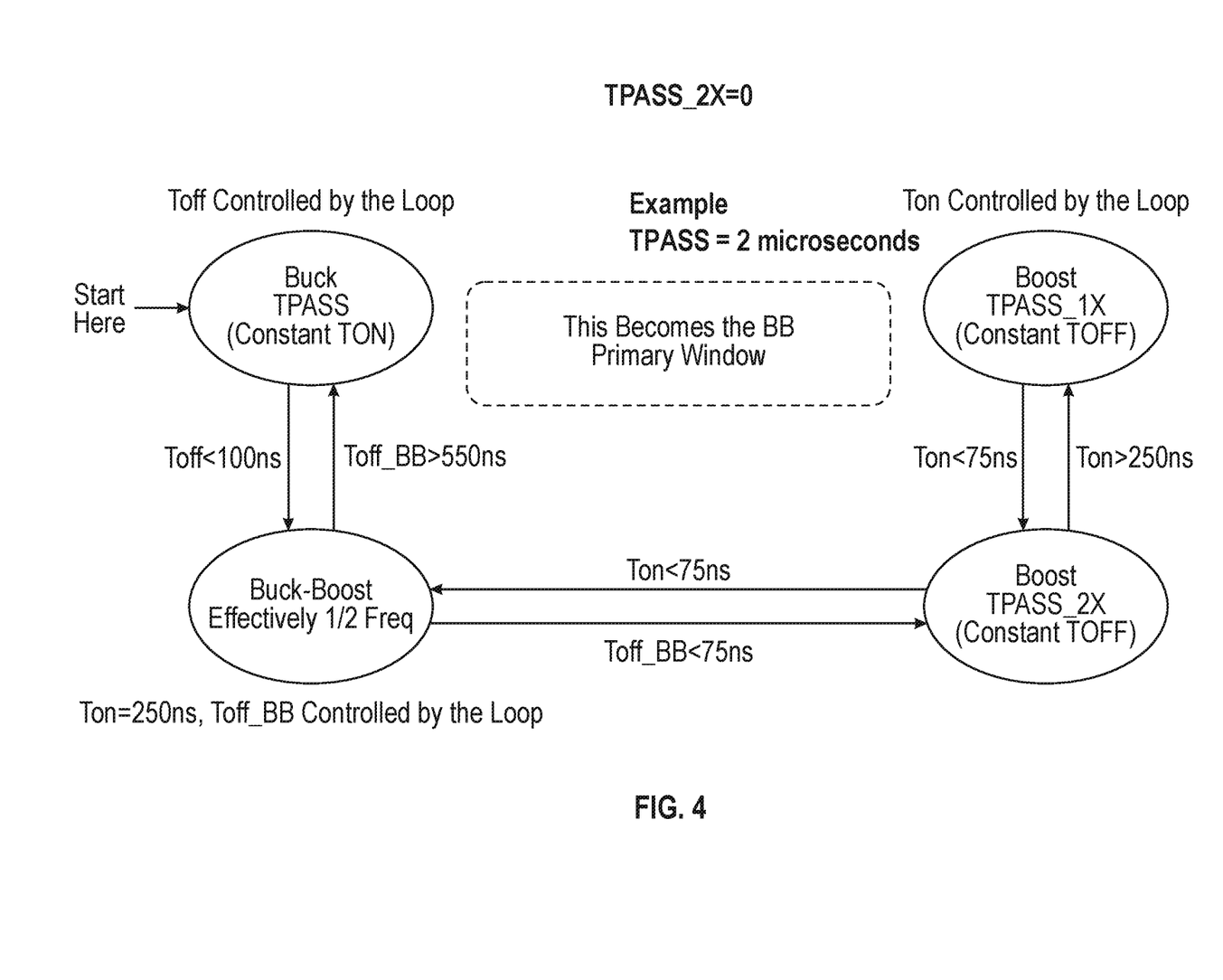
FIG. 4 is an alternative exemplary state diagram depicting mode states for the DC-DC converter depicted in FIG. 1.

FIG. 3 is an exemplary state diagram depicting mode states for the DC-DC converter 10 depicted in FIG. 1. The DC-DC converter 10 can start in any mode. For discussion purposes the upper left mode "Buck TPASS_1×" will be the first mode. This is a Buck switching mode in which TPASS is the long duration and nearly equal to the Total Period=TPASS+Toff. The Toff time is short and is controlled by the loop error voltage. For this example, specific times are chosen, but these are just for illustration of a near 500 kHz, pseudo-fixed frequency switching design. Thus, TPASS is close to the period of 2 microseconds. TPASS occurs for 2 microseconds and Toff occurs until the error voltage is crossed. This duration is expected to be short as the voltage at the VOUT node is close in value to the voltage at the VOUT node. For example, VOUT=12 V and VIN Buck transition may be 12.5 V. The TOFF during is set by the loop error, and the duration of the TOFF is captured by timing comparators. If the TOFF is <125 nanoseconds, then the transition to the next state will occur. Otherwise, the DC-DC converter 10 remains in the Buck mode for the next cycle, where the check is performed again. Some implementations may require multiple timing fails before a transition in modes. If the Toff falls below 125 nanoseconds, the next state is an optional digital frequency shift. The optional digital frequency shift remains in the Buck mode, but the TPASS time is now twice as long and is referred to as TPASS_2×=4 microseconds. Now the timing check is a window check. Toff below 300 nanoseconds but above 125 nanoseconds remains in the Buck TPASS_2× mode on each cycle until the timing falls outside of this window. If Toff>300 nanoseconds, then the mode transitions to Buck TPASS_1×, where the TPASS is back to 2 microseconds. If the Toff falls below 100 nanoseconds, the transition occurs to the Buck-Boost mode, shown in the lower center. Note that the TPASS_2× option is a digital frequency shift that divides the switching frequency of the DC-DC converter 10 by 2. Halving the switching frequency boosts the efficiency of the DC-DC converter 10, and the ripple voltage is small because the voltage at the VIN node is close to the voltage at the VOUT node, so the inductor ripple currents are small. Likewise, a separate analog frequency shift mode may be used. In this mode, as the voltage at the VIN node is close to the voltage at the VOUT node, the TPASS time stretches out as the two voltages come closer together. This analog frequency shift can be used to reduce switching losses even further as the voltage at the VIN node approaches the voltage at the VOUT node. The analog frequency shift occurs independent of the digital mode control algorithm. Also note that the mode transition never allows a direct Buck-to-Boost transition, or likely Boost-to-Buck. The mode must transition to the BB mode first go between the other two modes. The other modes transition in similar fashion as described above. FIG. 4 is an alternative exemplary state diagram depicting mode states for the DC-DC converter 10 depicted in FIG. 1.

Figure 5:
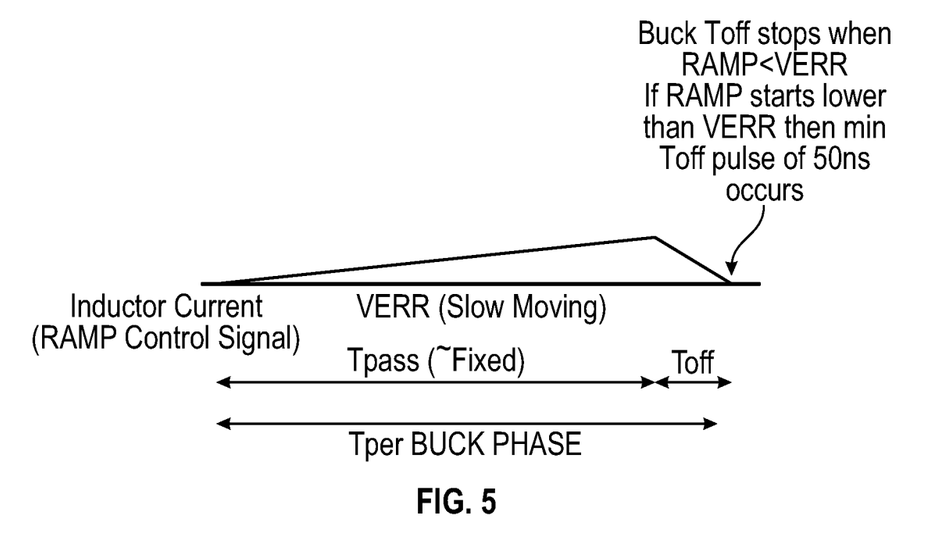
FIG. 5 is a diagram showing a Buck Mode Current waveform versus the Loop Error voltage.

FIG. 5 is a diagram showing a Buck Mode Current waveform versus the Loop Error voltage, which controls the end of the short TOFF time. The beginning of the cycle is the longer TPASS time. This longer time is a function of the voltage at the VIN node and the voltage at the VOUT node such that the overall frequency is relatively constant over variations in the voltage at the VOUT node and the voltage at the VIN node. The TPASS time in the Buck phase normally charges the inductor current. It is possible, though, when the voltage at the VIN node is close to the voltage at the VOUT node that the inductor current is discharging. If this is the case, the DC-DC converter 10 shifts to Buck-Boost cycle as Buck is not the proper mode of operation. This is done as the TOFF period becomes very short in duration. As TOFF becomes short, the Buck is effectively in a very high duty cycle operation. For example, if TOFF/(TPASS+TOFF)<2%, then the duty cycle is 98%. So, if the transition were at this point, the mode would be Buck up to 98% duty cycle and beyond that would transition to Buck-Boost.

Figure 6:
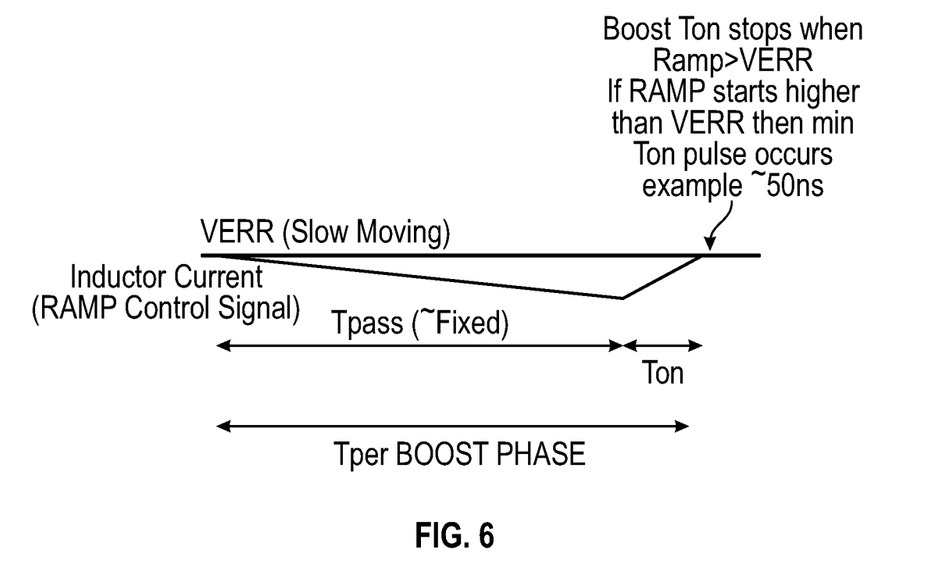
FIG. 6 is a diagram that shows a Boost Mode Current waveform versus the Loop Error voltage, which controls the end of the short TON time.

FIG. 6 is a diagram that shows a Boost Mode Current waveform versus the Loop Error voltage, which controls the end of the short TON time. The beginning of the cycle is the longer TPASS time. The TPASS time is a function of the voltage at the VIN node and the voltage at the VOUT node such that the overall frequency is relatively constant over variations in the voltage at the VOUT node and the voltage at the VIN node. The TPASS time in the Boost phase normally discharges the inductor current. It is possible, though, when the voltage at the VIN node is close to the voltage at the VOUT node that the inductor current is charging. If this is the case, the DC-DC converter 10 shifts to Buck-Boost cycle as Boost is not the proper mode of operation. This is done as the TON period becomes very short in duration. As TON becomes short, the Boost is effectively in a very low duty cycle operation. For example, if TON/(TPASS+TON)<2%, then the duty cycle is the same <2%. Therefore, if the transition were at this point, the mode would be Boost down to 2% duty cycle and below that would transition to Buck-Boost.

Figure 7:
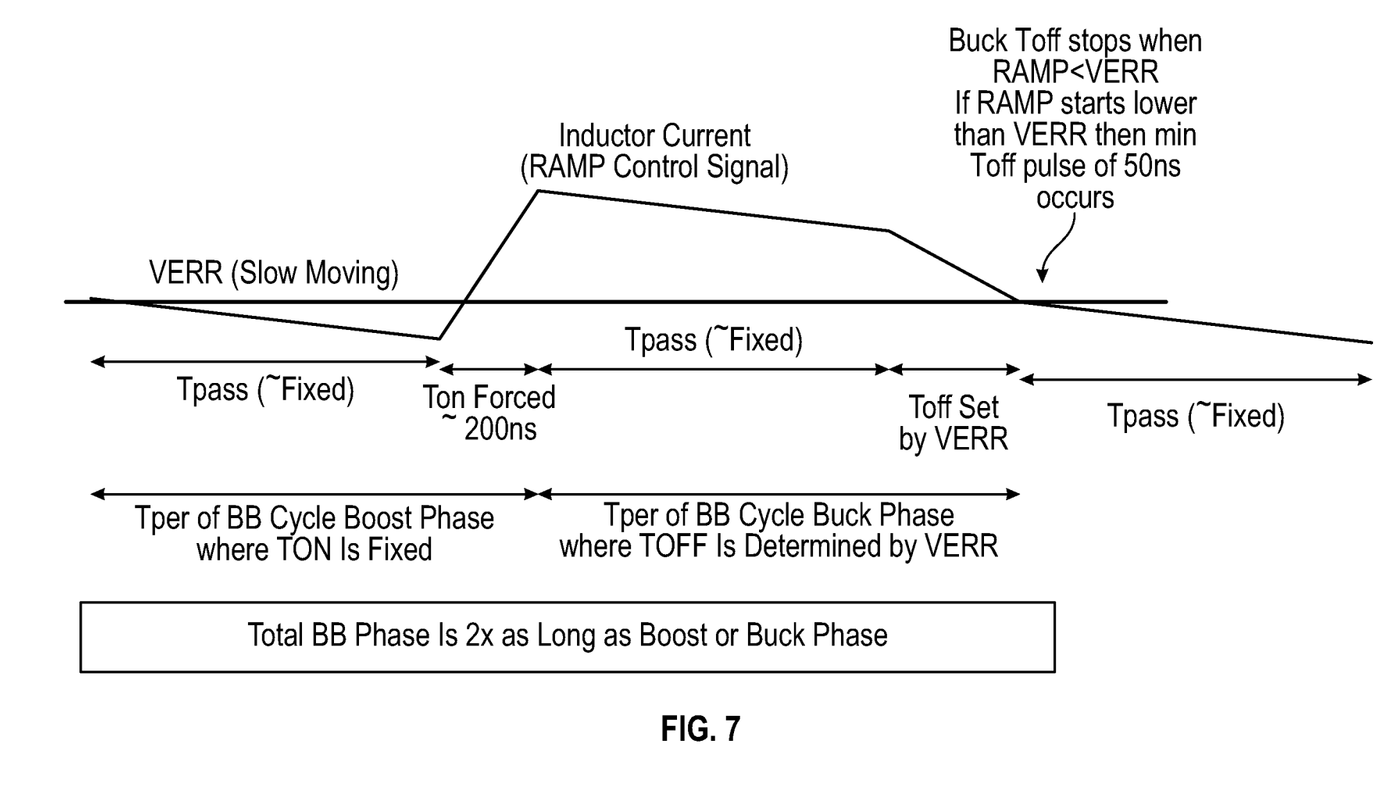
FIG. 7 is a diagram that shows a Buck-Boost Mode Current waveform versus the Loop Error voltage, which controls the end of the short TOFF time, of the Buck Portion of the cycle.

FIG. 7 is a diagram that shows a Buck-Boost Mode Current waveform versus the Loop Error voltage, which controls the end of the short TOFF time, of the Buck portion of the cycle. Note that if the transition occurs to Buck-Boost mode, the cycle becomes effectively one-half frequency, thus reducing switching losses of full-frequency buck boost. The half frequency is created by first a boost cycle of TPASS followed by a fixed TON. This is a forced Boost cycle of predetermined TPASS and TON. Following the Boost portion of the Buck-Boost mode, the Buck portion begins with a TPASS phase. This phase is of similar duration as the TPASS in the boost phase. TPASS in the Buck phase is followed by a TOFF, which is determined by the current control signal crossing the loop error voltage. This is variable. If the duration is too short, then the mode switches to Boost and the converter needs more boosting energy to maintain the output voltage. If the duration is too long, then the converter needs more Buck energy, so it transitions to the Buck mode. If the duration remains within a defined timing window, the converter stays in the Buck-Boost mode and begins another full buck-boost cycle. Some implementations may wait a full cycle or two before doing the timing window checks. This gives more time for the converter to settle out due to the mode transition, before making a mode transition decision.

Figure 8:
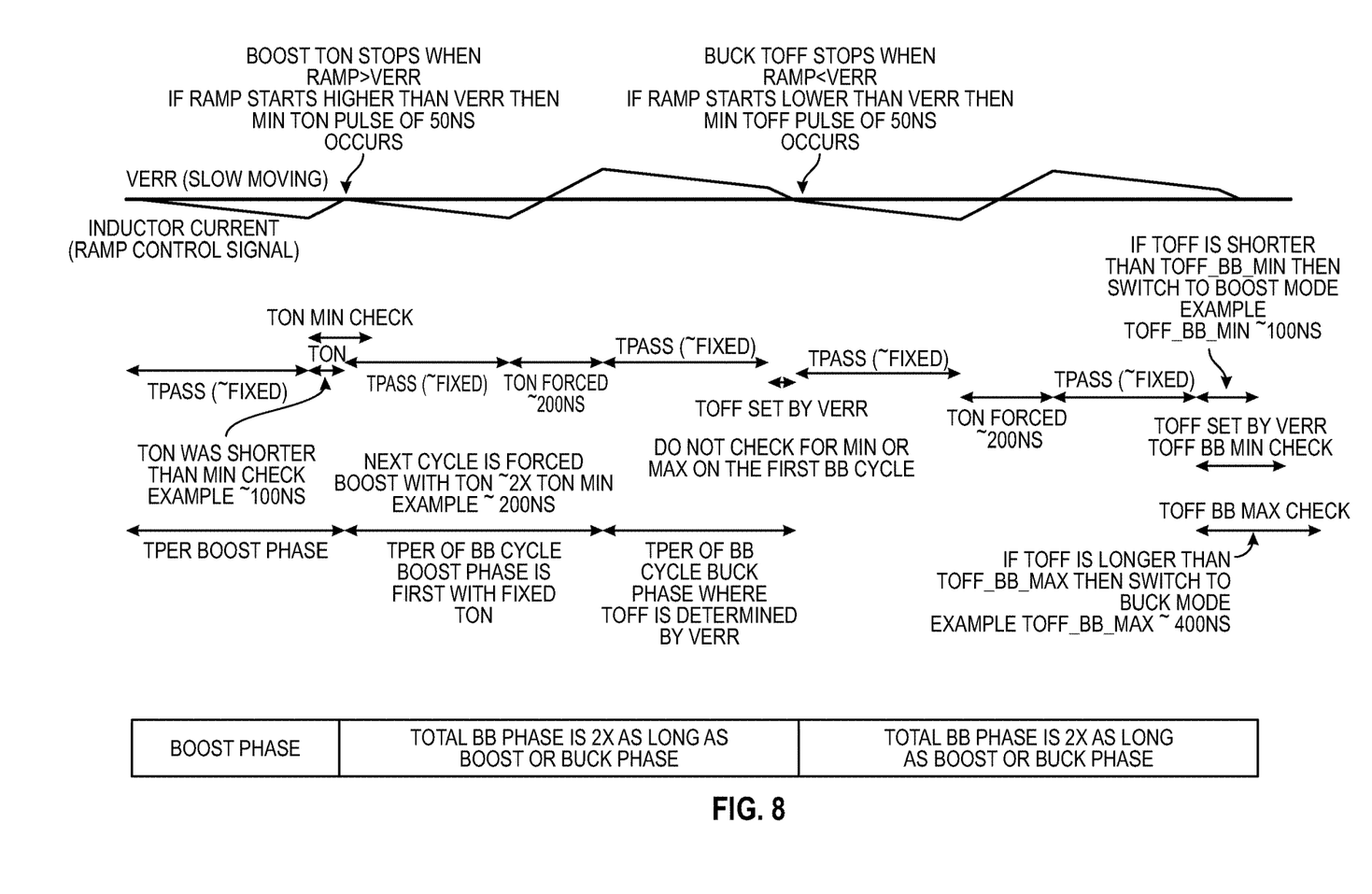
FIG. 8 is a diagram that shows a how the DC-to-DC converter transitions from the Boost phase to the Buck-Boost phase.

FIG. 8 is a diagram that shows a how the DC-DC converter 10 transitions from the Boost phase to the Buck-Boost phase. This waveform shows that after the switch from Boost to Buck-Boost, the DC-DC converter 10 ignores the timing check on the first full Buck-Boost cycle. The second cycle is checked for the timing window.

Figure 9:
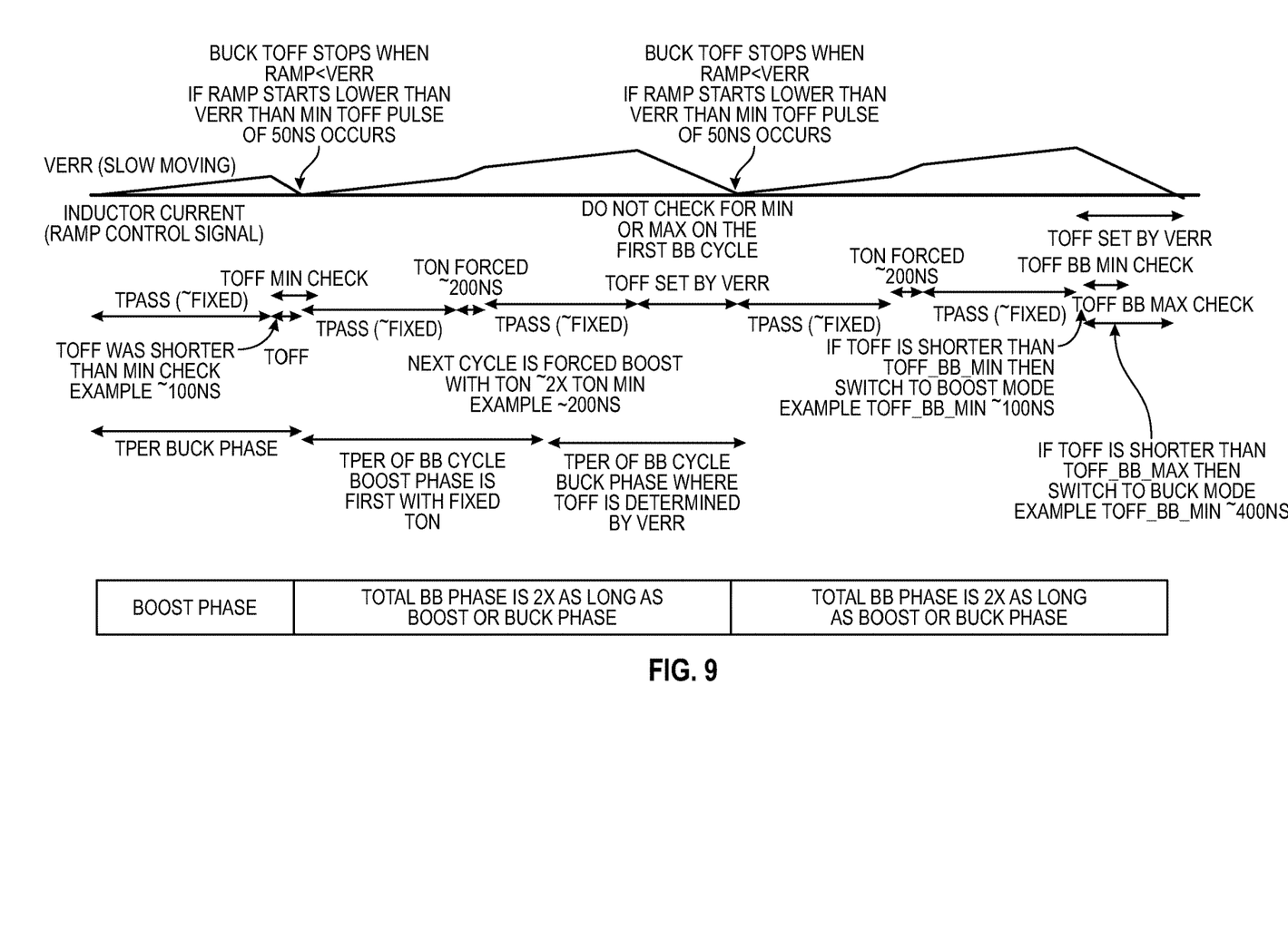
FIG. 9 is a diagram that shows a how the DC-to DC converter transitions from the Buck phase to the Buck-Boost phase.

FIG. 9 is a diagram that shows how the DC-DC converter 10 transitions from the Buck phase to the Buck-Boost phase. As in FIG. 8, the Buck-Boost first cycle timing check is ignored.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A DC-DC converter comprising:
   an electronic switch network having a supply node, a ground node, an output node, a first inductor node, a second inductor node, and switch control inputs;
   an inductor coupled between the first inductor node and the second inductor node; and
   control logic circuitry having switch control outputs coupled to switch control inputs, wherein the control logic circuitry is configured to cause the electronic switch network to couple the inductor between the supply node and the output node to provide current flow through the inductor for a fixed time period, and at the end of the fixed time period to measure a check time period until the current flow through the inductor is equal to a predetermined current value and based upon the measured check time period to determine to switch between buck operation and boost operation or boost operation and buck operation.

2. The DC-DC converter of claim 1 wherein the predetermined current value is zero.

3. The DC-DC converter of claim 1 wherein the control logic circuitry is further configured to be based upon the measured check time period to determine to switch between the buck operation and buck-boost operation.

4. The DC-DC converter of claim 1 wherein the control logic circuitry is further configured to be based upon the measured check time period to determine to switch between the boost operation and buck-boost operation.

5. The DC-DC converter of claim 1 further comprising a loop comparator that is configured to compare an error voltage reference to a ramp signal that is indicative of the inductor current flowing through and in response generating an error comparison signal.

6. The DC-DC converter of claim 5 wherein the control logic circuitry comprises:
   a first AND gate that is configured to perform an AND function on an inverted version of the error comparison signal and a buck determination signal and output a first AND result;
   a second AND gate that is configured to perform an AND function on the error comparison signal and a boost determination signal and output a second AND result;
   an OR gate that is configured to perform an OR function on the first AND result and the second AND result to generate an OR result; and
   a set/reset flip-flop configured to receive the OR result and set a beginning of the fixed time period during which current flows through the inductor between the supply node and the output node.

7. The DC-DC converter of claim 6 wherein the set/reset flip-flop is further configured to receive a reset signal to define an ending of the fixed time period during which current flows through the inductor between the supply node and the output node.

8. The DC-DC converter of claim 1 wherein the fixed time period ranges between 250 nanoseconds to 1 microsecond.

9. The DC-DC converter of claim 1 wherein the fixed time period ranges between 1 microsecond and 8 microseconds.

10. A method of controlling a DC-DC converter comprising:
    providing control signals to switch control inputs of an electronic switch network having a supply node, a ground node, an output node, a first inductor node, a second inductor node and an inductor coupled between the first inductor node and the second inductor node, wherein the control signals cause the electronic switch network to couple the inductor between the supply node and the output node to provide current flow through the inductor for a fixed time period;

measuring a check time period at the end of the fixed time period until the current flow through the inductor is equal to a predetermined value; and determining based upon the measured check time period to switch between buck operation and boost operation or boost operation and buck operation.

11. The method of controlling the DC-DC converter of claim 10 wherein the predetermined current value is zero.

12. The method of controlling the DC-DC converter of claim 10 further comprising switching between the buck operation and buck-boost operation based upon the measured check time period.

13. The method of controlling the DC-DC converter of claim 10 further comprising switching between the boost operation and buck-boost operation based upon the measured check time period.

14. The method of controlling the DC-DC converter of claim 10 further comprising comparing an error voltage reference to a ramp signal that is indicative of the inductor current flowing through and in response generating an error comparison signal.

15. The method of controlling the DC-DC converter of claim 14 wherein the control logic circuitry comprises:
performing an AND function on an inverted version of the error comparison signal and a buck determination signal and outputting a first AND result;
performing an AND function on the error comparison signal and a boost determination signal and outputting a second AND result;
performing an OR function on the first AND result and the second AND result to generate an OR result; and
setting a beginning of the fixed time period based upon the OR result.

16. The method of controlling the DC-DC converter of claim 15 further comprising defining an ending of the fixed time period during which current flows through the inductor between the supply node and the output node method based upon a reset signal.

17. The method of controlling the DC-DC converter of claim 10 wherein the fixed time period ranges between 250 nanoseconds to 1 microsecond.

18. The method of controlling the DC-DC converter of claim 10 wherein the fixed time period ranges between 1 microsecond and 8 microseconds.

19. The method of controlling the DC-DC converter of claim 10 further comprising
comparing input voltage at the supply node to an input voltage threshold; and
comparing output voltage at the output node to an output voltage threshold and in response generating a force buck signal to put the DC-DC controller in the buck mode if the input voltage and/or the output voltage is above the input voltage threshold and/or above the output voltage threshold.

20. The method of controlling the DC-DC converter of claim 10 further comprising
comparing input voltage at the supply node to an input voltage threshold; and
comparing output voltage at the output node to an output voltage threshold and in response generating a force boost signal to put the DC-DC controller in the boost mode if the input voltage and/or the output voltage is below the input voltage threshold and/or below the output voltage threshold.

* * * * *